United States Patent

[19]

Hunter

[11] 4,174,996

[45] Nov. 20, 1979

[54] PIPE JOINTING

[76] Inventor: John Hunter, 63 Osborne Rd., Kiveton Park, Near Sheffield, England

[21] Appl. No.: 862,984

[22] Filed: Dec. 21, 1977

Related U.S. Application Data

[63] Continuation-in-part of Ser. No. 620,289, Oct. 7, 1975, abandoned.

[51] Int. Cl.² ............................................. B32B 31/00
[52] U.S. Cl. ............................................... 156/499
[58] Field of Search ........................ 156/499, 304, 322

[56] References Cited

U.S. PATENT DOCUMENTS

| 2,384,014 | 9/1945 | Cutter | 156/499 |
|---|---|---|---|
| 2,800,867 | 7/1957 | Smith | 113/102 |
| 3,013,925 | 12/1961 | Larsen | 156/322 |
| 3,552,265 | 1/1971 | Lucas | 156/258 |
| 3,846,208 | 11/1974 | McElroy | 156/304 |
| 4,071,395 | 1/1978 | McElroy | 156/304 |

*Primary Examiner*—Douglas J. Drummond
*Attorney, Agent, or Firm*—Lowe, King, Price & Becker

[57] ABSTRACT

Apparatus for jointing together by socket fusion two plastics pipe lengths, or one plastics pipe length and a plastics fitting comprises a frame;

first and second ring clamps each slidably mounted on said frame so as to be movable towards or away from one another;

means to effect movement of said clamps relatively towards and away from one another;

said first clamp being dimensioned to clamp one end of a first pipe length and squeeze said end into a circular shape;

said second clamp being dimensioned to clamp a fitting, or a socket end of a second spigot and socket pipe length, and said second clamp including a plurality of arcuate bearing shoes each operable on by one of a plurality of screw adjusters carried by said second clamp, said bearing shoes together being adapted to make circumferential contact over substantially the whole of the periphery of said fitting or said socket end, said screw adjusters being adjustable to cause axial alignment of said fitting with respect to said end of said first pipe length, or of said socket end with respect to said end of said first pipe length; and a heating means for bringing surfaces to be fused together to fusion temperature.

13 Claims, 5 Drawing Figures

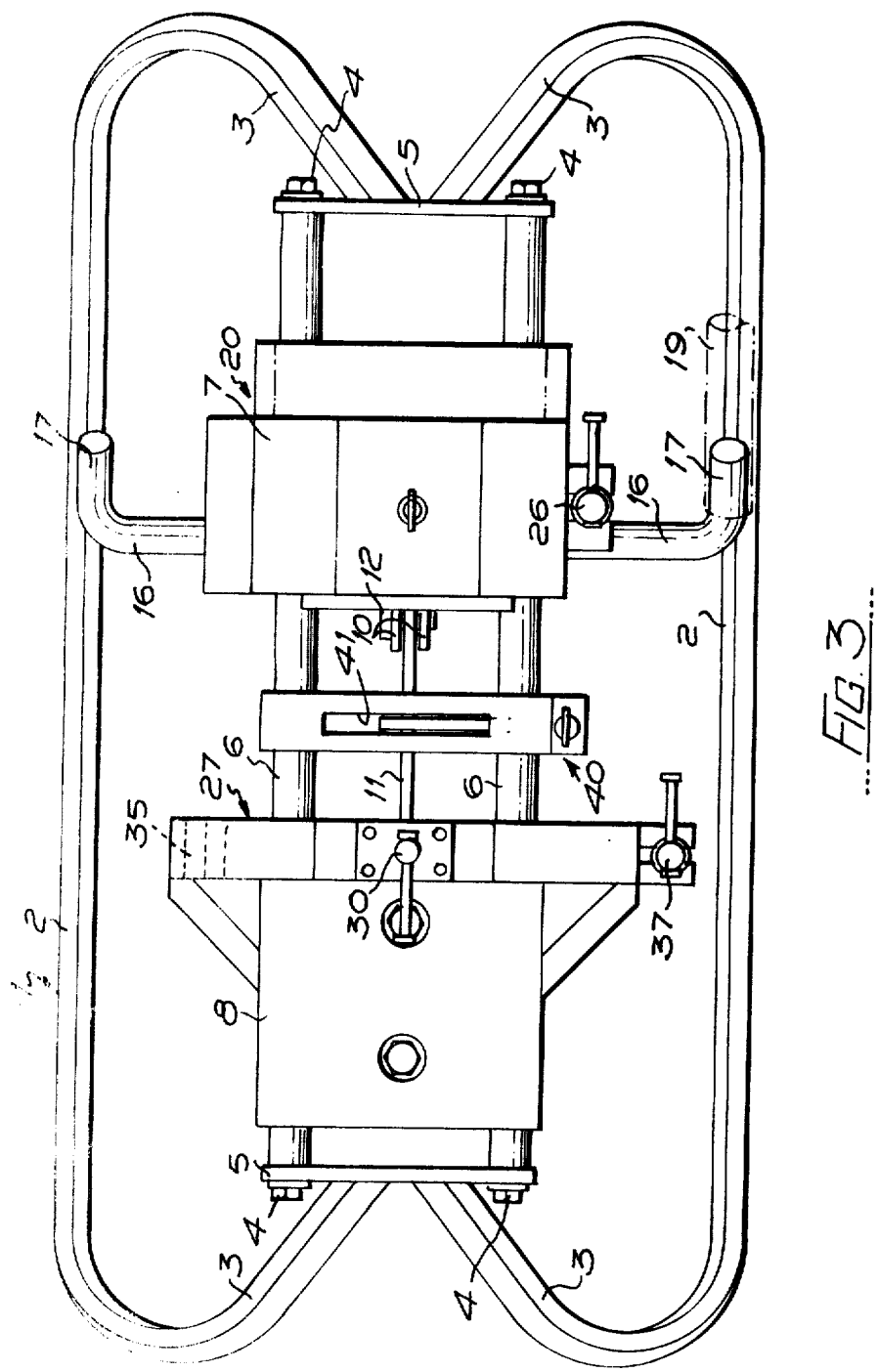

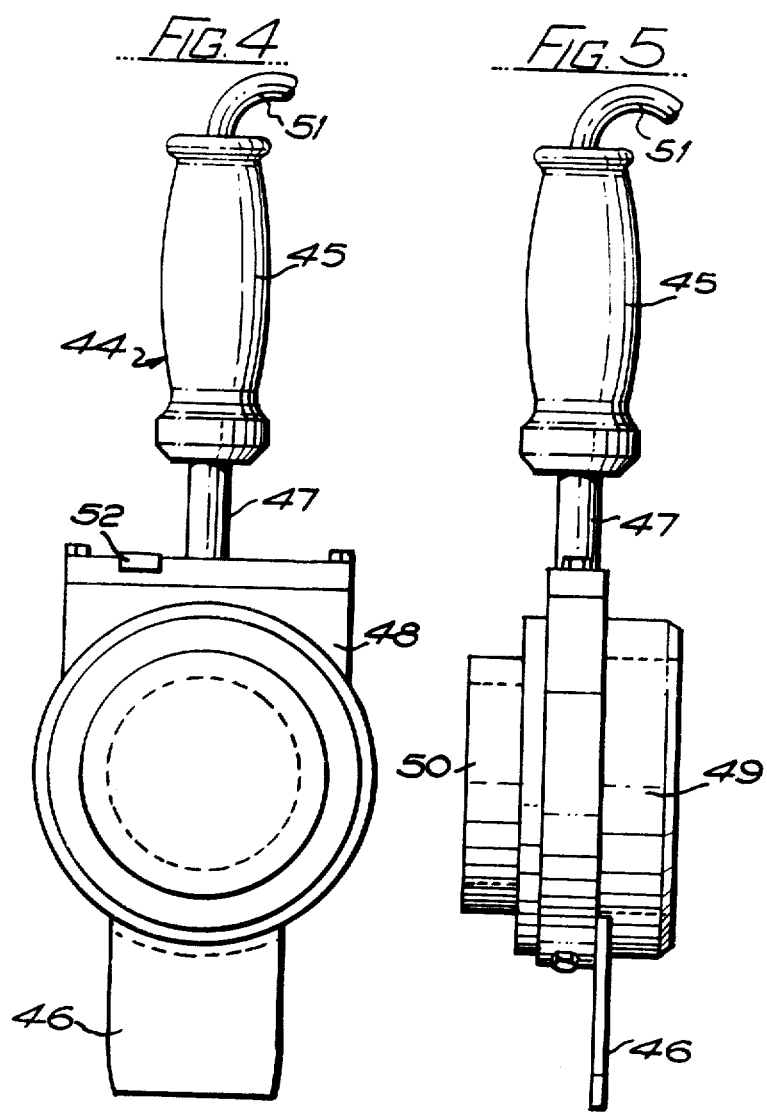

PIPE JOINTING

This application is a continuation-in-part of Ser. No. 620,289, filed Oct. 7, 1975, now abandoned.

This invention relates to a method of, and apparatus for use in, jointing two pipe lengths (as hereinafter defined) or one pipe length and a fitting (as hereinafter defined) of plastics material by fusion welding, and is particularly useful for in-trench working.

By "pipe lengths" is meant length of plastics piping supplied either in lengths, or supplied in continuous coil form to be cut on site into lengths, before or after fusion welding. Thus pipe manufacturers usually supply plastics piping of 4 inch diameter and upwards in straight lengths, and 3 inch diameter and less in coils.

The pipe lengths may be of the spigot and socket type, in which case fusion welding is effected at the spigot of one pipe length and the interengaging socket of the adjacent pipe length. Thus the fitting may be in the form of an external sleeve or collar. This may be supplied already attached to one end of a pipe length, or it may be a separate sleeve or collar, in which case it is first necessary to attach the sleeve or collar to one pipe length to be followed by attachment of the next pipe length to the sleeve or collar, again by fusion welding. These fittings may also take the form of tees, Y's, 90° bends, 45° bends, "blank-end" caps, flange adaptors, or reducing/enlarging couplings, in most of which cases, the pipe lengths to be joined do not contact one another, but are joined together via the fitting. Thus "fitting" is to be construed as embracing all the elements described above as such.

Such jointing of pipe lengths by fusion welding basically involves the technique of heating the surfaces to be joined by some heating means usually electric, removing the heating means after the surfaces have attained a sufficient temperature, and bringing the surfaces into contact, usually by forcing them together so that the plastics material of the surfaces fuses together to effect the jointing.

However, some of the problems encountered with this technique are that the pipe length(s) and/or fitting may not be within close tolerances and may be ill fitting due to their being misshapen, e.g., oval. Furthermore, difficulty is encountered in gripping the pipe length(s) and/or any fitting without causing damage, and in holding them in co-axial relationship ready for jointing, this may be more difficult due to curvature, if the pipe "lengths" are supplied as a continuous coil pipe. It may be necessary to bring the pipe length(s) and/or any fitting quickly onto the heating means in sequence to allow for differing heating times. Also removal of the pipe length(s) and/or any fitting from the heating means is difficult and may give rise to distortion if the heating means becomes misaligned. It will be appreciated that these problems contribute to poor joints.

A known pipe jointing apparatus comprises two "V" beds to receive pipes and/or fittings, a displaceable clamp head co-operating with each bed to clamp respective pipe ends to be joined, and hand operable toggle means to move the respective pipe ends towards one another by displacing the beds and clamp heads along spaced, parallel guide tubes. Such apparatus is satisfactory only when truly circular pipe ends are involved and basically only for producing a butt-joint. If it is required for instance to overlap each pipe end with a connecting sleeve, a portion of a "T"-piece, etc., then such a fitting must be hand held, despite it having molten plastics surface areas, and manually telescoped over the approaching pipe ends, which necessarily also have molten plastics surface areas. This procedure does not lend itself to the formation of good joints. Firstly, the telescoping of components with relatively little tolerance between external and internal dimensions is awkward whilst time delays whilst effecting the telescoping results in the temperature of the molten plastics surface areas falling below the optimum fusing temperature.

The primary object of the present invention is to provide a pipe jointing apparatus capable of jointing a fitting to a pipe end, in which the fitting position may be readily adjusted with respect to the pipe end position, before any heating is effected to surface areas, to ensure that after heating, the fitting and pipe end may be telescoped by the apparatus.

According to the present invention, an apparatus for jointing together by socket fusion two plastics pipe lengths, or one plastics pipe length and a plastics fitting comprises a frame;

first and second ring clamps each slidably mounted on said frame so as to be movable towards or away from one another;

means to effect movement of said clamps relatively towards and away from one another;

said first clamp being dimensioned to clamp one end of a first pipe length and squeeze said end into a circular shape;

said second clamp being dimensioned to clamp a fitting, or a socket end of a second spigot and socket pipe length, and said second clamp including a plurality of arcuate bearing shoes each operable on by one of a plurality of screw adjusters carried by said second clamp, said bearing shoes together being adapted to make circumferential contact over substantially the whole of the periphery of said fitting or said socket end, said screw adjusters being adjustable to cause axial alignment of said fitting with respect to said end of said first pipe length, or of said socket end with respect to said end of said first pipe length; and a heating means for bringing surfaces to be fused together to fusion temperature.

The second clamp may comprise three arcuate bearing shoes and three screw adjusters located 120° apart. Preferably, the second clamp is of inwardly open channel section, said bearing shoes being located in said channel section and radially slidable with respect to said second clamp by operation of their respective screw adjusters. Each of said bearing shoes may be provided with a radial, tapped hole into which one of said screw adjusters is threaded, said bearing shoe running along its screw adjuster upon rotation of the latter, to effect a clamping/unclamping action. The bearing shoes may be readily replaceable by differently dimensioned bearing shoes whereby one apparatus is usable to fuse two differing pipe sizes, e.g., 90 mm and 125 mm piping. The second clamps may be mounted to so that they are capable of angular adjustment about a vertical axis, which angular adjustment may be desirable in some service conditions. Preferably, said first and second clamps are mounted on a slidable carriage. Thus, each of said carriages may be mounted on a common pair of spaced-apart, parallel slide bars. Conveniently, said frame is a skid frame in which said slide bars are mounted. The first clamp may be of relatively long cylindrical shape, and may incorporate a readily removable reducing sleeve, to allow the clamp to be used for differing pipe sizes. The heating means may be of a generally known kind to be located in the apparatus by a tongue and slot arrangement. Preferably said means to move said clamps comprises a toggle linkage with operating handles.

The invention will now be described in greater detail by way of example with reference to the accompanying drawings, in which:

FIG. 3 is a plan view of FIG. 1;

FIG. 4 is a front elevation of a heating means suitable for use with the apparatus of FIGS. 1 to 3; and FIG. 5 is a side elevation of FIG. 4.

Figure 1:
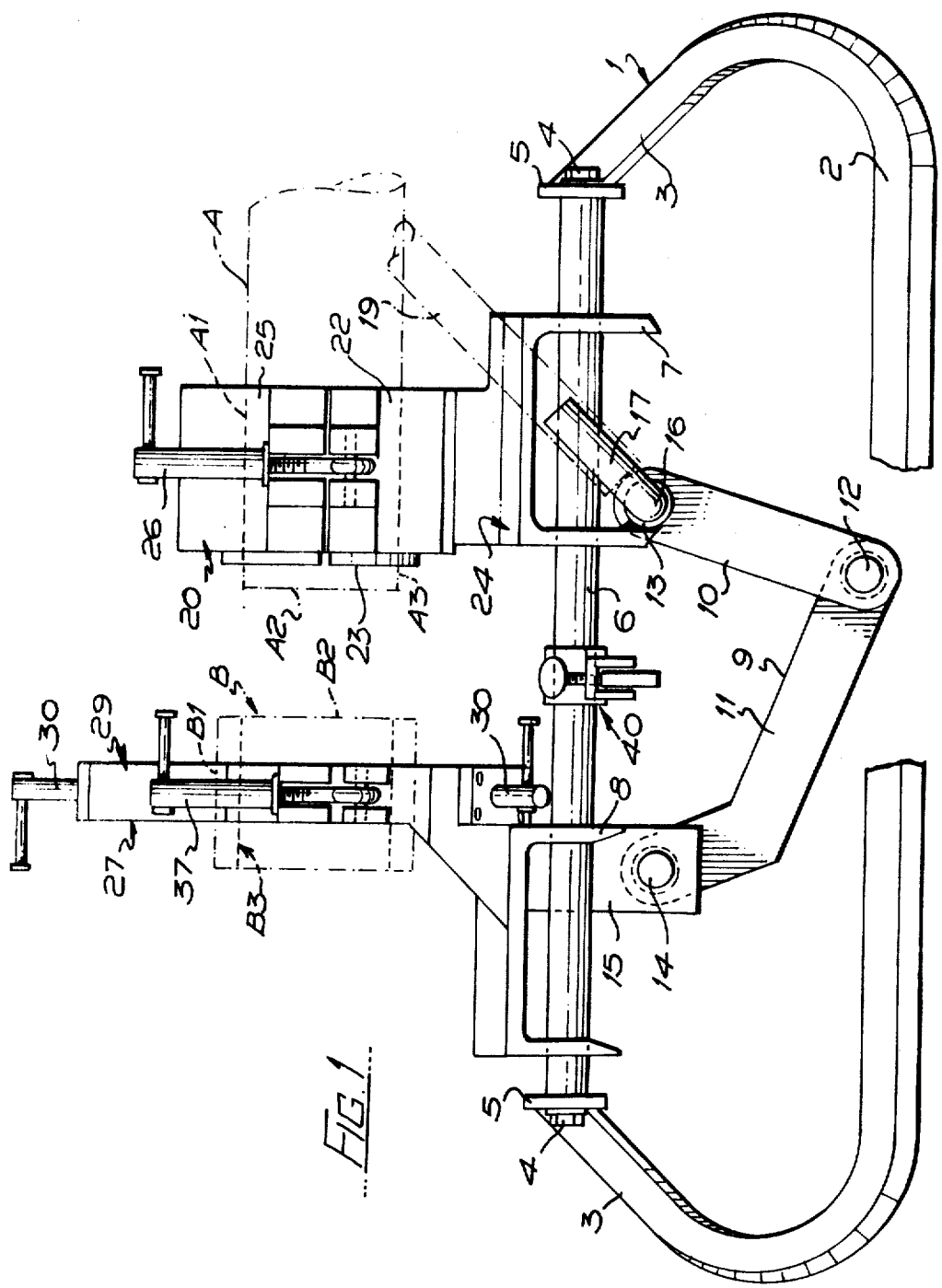
FIG. 1 is a side elevation of apparatus according to the invention.
Figure 2:
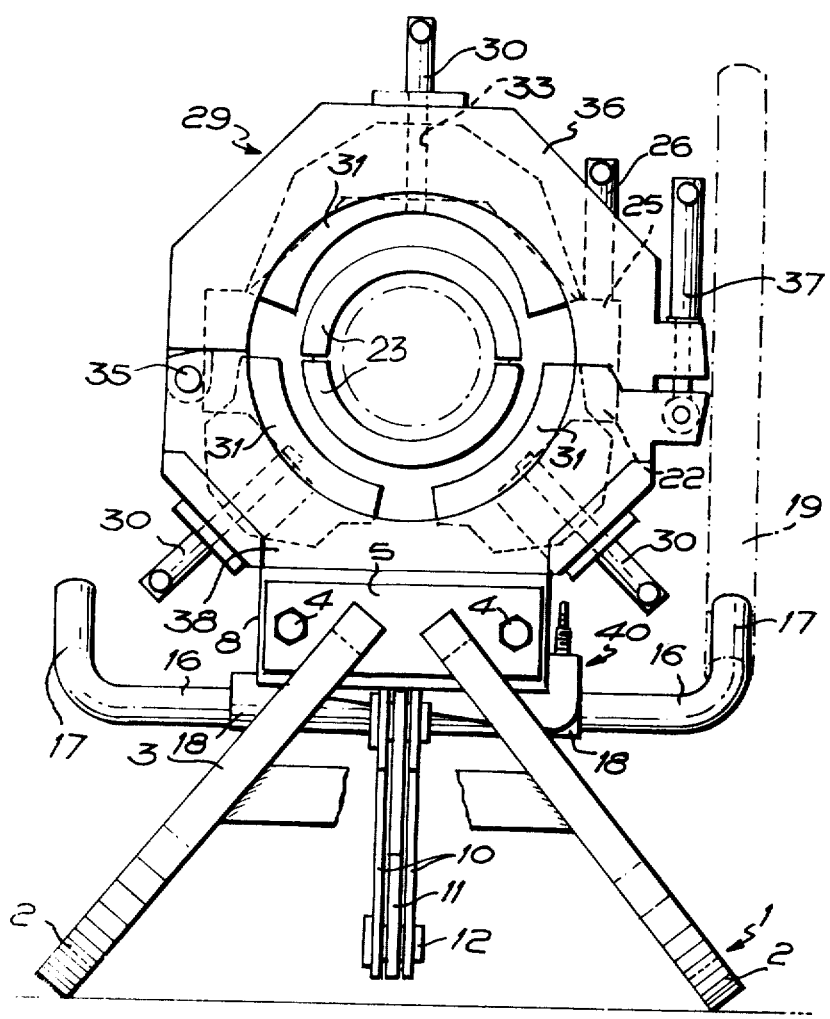
FIG. 2 is an end elevation of FIG. 1.

The apparatus shown in FIGS. 1 to 3 is intended for the "in-trench" fusion jointing of a pipe length A to a fitting B and comprises a skid-frame 1 made up of two spaced runners 2 with upwardly and inwardly bent ends 3. Across the ends 3 of each runner 2 is secured, by bolts 4 and between stops 5, one of a pair of spaced parallel slide bars 6.

Mounted on the slide bars 6 are first and second carriages 7 and 8 respectively, that are suitably apertured to accommodate the slide bars 6 and are movable towards and away from one another along the slide bars 6 under the control of a displacement means 9. The means 9 comprises two links 10 and a link 11 joined at a common pivot 12, the links 10 at their ends remote from the pivot 12 being pivotally attached at 13 to the first carriage 7 and the link 11 remote from the pivot 12, being pivotally attached at 14 to the second carriage 8 via spaced brackets 15 depending from the carriage 8. An actuating bar 16, with upwardly bent ends 17, constitutes the pivot 13, and is supported from the first carriage 7 by two, spaced "U" straps 18, while an operating handle 19 is fitted over one or other of the ends 17, whichever is most convenient for the operator, when it is desired to displace the carriages 7, 8 towards or away from one another.

The carriage 7 carries a first ring clamp 20 to be secured, in use, around an end portion A1 of the pipe length A, with end A2 exposed over a predetermined length, to provide an external circumferential surface A3 to be heated and fusion welded. The clamp is formed in two halves (as can be seen best in FIG. 2) being a lower half 22 pivoted at 21 to an upper half 25. Each half 22, 25 carries a semi-circular reducing liner 23 which together form a reducing sleeve which is readily removable to accommodate different pipe sizes. Thus, the same apparatus may be used for instance to fusion joint both 90 mm and 125 mm pipe. The lower clamp half 22 is located on a mounting means 24 so arranged on the carriage 7 that the clamping means 20 may be pivoted about a vertical axis, if required. The upper clamp half 25 carries a closing lever 26, which, in the clamping position shown in FIG. 2, engages a lug carried by the lower half 22 to clamp the pipe end portion A1 and simultaneously true the pipe end A2 to circular shape.

The second carriage 8 carries a second ring clamp 27 to be secured, in use, around an end portion B1 of a fitting B in the form of a collar, with end B2 exposed over a predetermined length to provide an internal circumferential surface B3 to be heated and fusion welded to the surface A3. The clamp 27 is attached to the carriage 8, such that the position of the clamp 27 may be adjusted about a vertical axis, if required. As best seen in FIG. 2, the clamp 27 comprises a ring 29 having three hand operable screw adjusters 30 arranged 120° apart. With each adjuster 30 is associated an arcuate bearing shoe 31 having an arcuate bearing surface 32 to engage and clamp the external periphery of the fitting B, and a tapped hole 33 to receive a screw adjuster 30. Again the clamp 27 is made up of two halves hinged together at 35, an upper half 36 carrying a lever 37 which, in the fitting clamping position shown in FIG. 2, engages a lug carried by the lower half 38.

Between the carriages 7 and 8, and also located on the slide bars 6 is a mounting means 40 for a heating means, which is described later in detail. The mounting means 40 has a transverse slot 41.

The heating means as shown in FIGS. 4 and 5, takes the form of a known heating tool 44 comprising a handle 45 by which the operator manoeuvres a tongue 46 into the slot 41, the handle being connected via a shaft 47 to a support structure 48 for heaters 49 and 50, and electric supply lead 51 to power the heaters passing through the handle 45 and shaft 47 while the support structure 48 also carries a thermometer 52. Obviously the diameters (internal for the heater 49 which is adapted to fit round the surface A3 of the pipe length A, and external for the heater 50 which is adapted to fit inside the surface B3) must be selected according to the dimension of the pipe length A and fitting B which it is desired to joint on to the apparatus.

Thus, in use, the end A1 of the pipe length A is placed in the open clamp 20 and the upper half 25 of the clamp is closed and the lever 26 engaged with its lug. The pipe length A could be "free" or its end remote from the apparatus could be in a trench attached to other pipe lengths forming part of a pipeline. The fitting B is then similarly fitted into the clamp 27 and the screw adjusters 30 are rotated so that the fitting is positively and accurately positioned co-axially with respect to the pipe end A2. With the handle 19 in a position to space apart the carriages 7 and 8 and hence the clamps 20 and 27, the heating tool 44 is inserted into the slot 41. Its position with respect to the apparatus may be adjusted if necessary by means of the screws 43, until its heaters 40 and 50 are axially aligned with the pipe end A2 and the fitting end B2, which is readily checked by operating the handle 10 whereupon if the heating tool 44 is properly positioned, the pipe end A2 should just telescope inside the heater 49 simultaneously with the fitting end B3 telescoping over the heater 50. Once the operator is satisfied that the various elements are axially aligned, the handle 19 is again operated to draw apart the clamps 20 and 27 and electric power is supplied to the heating tool 44. As soon as this has attained the required temperature (dependent upon the characteristics of the particular plastics material of the pipe length A and fitting B) which the operator checks by observing the thermometer 52, the handle 19 is operated to engage the surfaces A3 and B3 in and around the heaters 49 and 50 respectively, and the apparatus remains in this position for a predetermined length of time to allow the surfaces A3 and B3 to attain the required fusion temperature (and again this depends upon the characteristics of the particular plastics material of the pipe length A and fitting B). When this time length has elapsed, the handle 19 is operated to withdraw the surfaces A3 and B3 from the heating tool 44 whereupon the latter can rapidly be removed, for it will be appreciated that the surfaces A3 and B3 begin to cool immediately upon removal from the heating tool 44. Once the heating tool 44 has been removed, reverse operation of the handle 19 telescopes together the pipe end A2 and fitting end B2 to bring the surfaces A3 and B3 into contact and the apparatus remains in this condition for a predetermined length of time (again dependent upon the characteristics of the particular plastics material of the pipe length A and fitting B) for fusion welding between the surface A3 and B3 to have taken place. Thus, a sound fused joint is always effected due to the alignment capabilities of the clamp 29, so that once correctly set up to make a joint, no misalignment is possible, so that the surfaces to be fused are brought together with negligible loss of time after removal of the heating means.

What I claim is:

1. An apparatus for jointing together by socket fusion two plastics pipe lengths, or one plastics pipe length and a plastics fitting, comprising:

a frame;

first and second ring clamps each slidably mounted on said frame so as to be movable towards or away from one another;

means to effect movement of said clamps relatively toward and away from one another;

said first clamp being dimensioned to clamp one end of a first pipe length and squeeze said end into a predetermined shape;

said second clamp being dimensioned to clamp a fitting, or a socket end of a second spigot and socket pipe length, and said second clamp including a plurality of arcuate bearing shoes circumferentially separated from each other with each being operable on independently of the others by one of a plurality of screw adjusters carried by said second clamp, said bearing shoes together being adapted to make circumferential contact over substantially the whole of the periphery of said fitting or said socket end, said screw adjusters being adjustable to cause axial alignment of said fitting with respect to said end of said first pipe length, or of said socket end with respect to said end of said first pipe length; and a heating means for bringing surfaces to be fused together to fusion temperature.

2. Apparatus as claimed in claim 1, wherein said second clamp comprises three arcuate bearing shoes and three screw adjusters located 120° apart.

3. Apparatus as claimed in claim 1, wherein said second clamp is of inwardly open channel section, said bearing shoes being located in said channel section and radially slidable with respect to said second clamp by operation of their respective screw adjusters.

4. Apparatus as claimed in claim 3, wherein each of said bearing shoes is provided with a radial, tapped hole into which one of said screw adjusters is threaded, said bearing shoe running along its screw adjuster upon rotation of the latter, to effect a clamping/unclamping action.

5. Apparatus as claimed in claim 2, wherein said bearing shoes are readily replaceable by differently dimensioned bearing shoes whereby one apparatus is usable to fuse two differing pipe sizes.

6. Apparatus as claimed in claim 1, wherein first and second clamps are mounted so that they are capable of angular adjustment about a vertical axis.

7. Apparatus as claimed in claim 1, wherein said first and second clamps are mounted on a slidable carriage.

8. Apparatus as claimed in claim 7, wherein each of said carriages is mounted on a common pair of spaced-apart, parallel slide bars.

9. Apparatus as claimed in claim 1, wherein said frame is a skid frame in which said slide bars are mounted.

10. Apparatus as claimed in claim 1, wherein said first clamp is of relatively long cylindrical shape.

11. Apparatus as claimed in claim 1, wherein said first clamp incorporates a readily removable reducingg sleeve, to allow the clamp to be used for differing pipe sizes.

12. Apparatus as claimed in claim 1, wherein said heating means is located in the apparatus by a tongue and slot arrangement.

13. Apparatus as claimed in claim 1, wherein said means to move said clamps comprises a toggle linkage with operating handles.

* * * * *